V. B. HENBY & H. FINTEL, Jr.
THILL COUPLING.
APPLICATION FILED MAR. 2, 1909.
930,286. Patented Aug. 3, 1909.
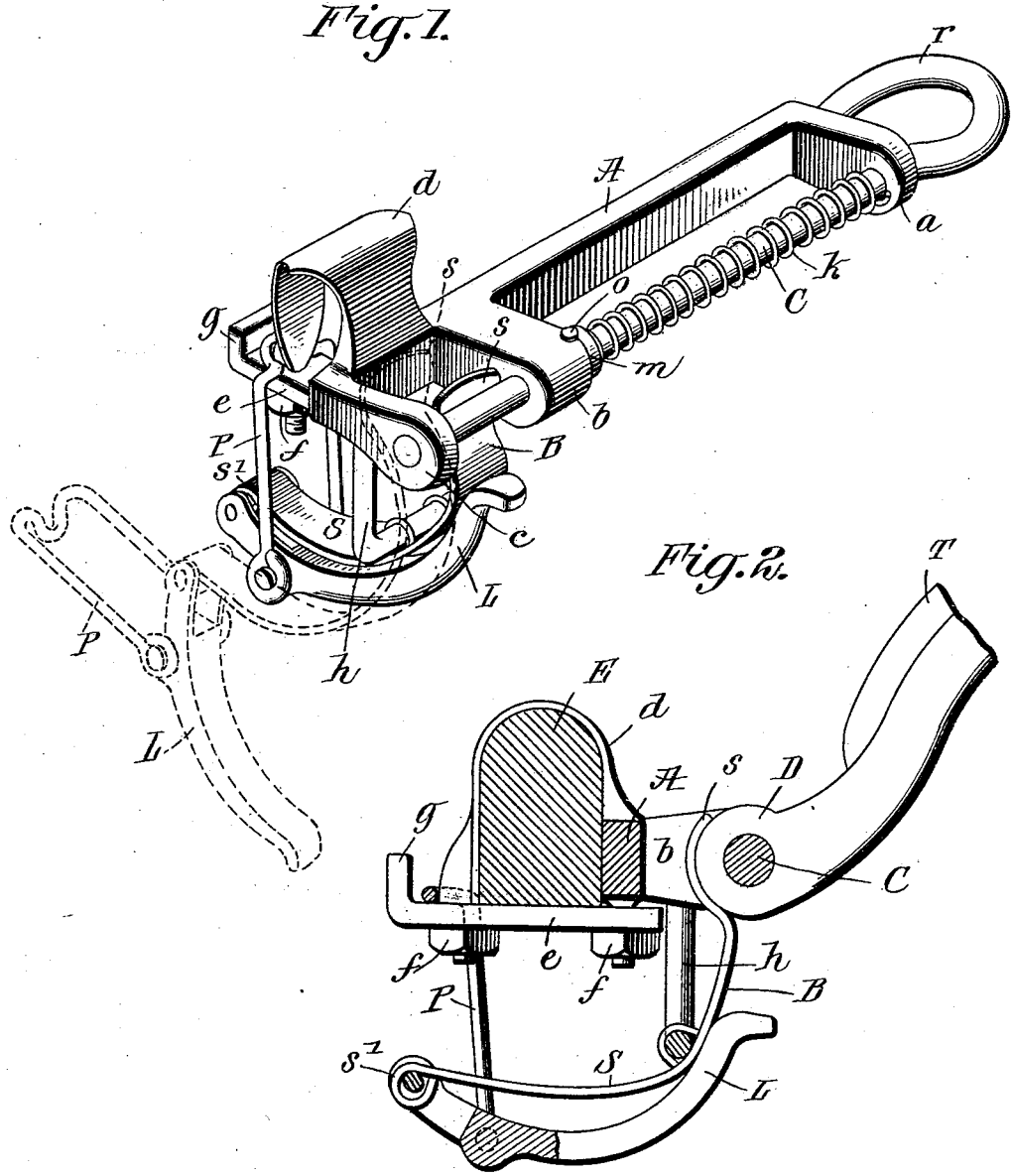
WITNESSES
Samuel E. Wade
L. A. Stanley
INVENTORS
VERNE B. HENBY
HENRY FINTEL JR.
BY
ATTORNEYS

UNITED STATES PATENT OFFICE.

VERNE B. HENBY AND HENRY FINTEL, JR., OF HARDY, NEBRASKA.

THILL-COUPLING.

No. 930,286.　　　Specification of Letters Patent.　　　Patented Aug. 3, 1909.

Application filed March 2, 1909. Serial No. 480,884.

*To all whom it may concern:*

Be it known that we, VERNE B. HENBY and HENRY FINTEL, Jr., citizens of the United States, and residents of Hardy, in the county of Nuckolls and State of Nebraska, have made certain new and useful Improvements in Thill-Couplings, of which the following is a specification.

Our invention relates to improvements in thill couplings and it consists in the combinations, constructions and arrangements hereinafter described and claimed.

The main object of our invention is to provide an improved means for enabling the draft eye to be detached or inserted, while at the same time we provide means for holding the draft eye in close contact with the coupling pin to prevent rattling of the various parts.

Further objects and advantages will appear in the following specification and the novel features of the device will be particularly pointed out in the appended claim.

Our invention is illustrated in the accompanying drawings, in which—

Figure 1 is a perspective view showing one embodiment of our invention, and Fig. 2 is a detail view in section showing the relation of the operating parts.

Our invention is designed to be an improvement over certain existing forms of thill coupling devices. Some of these devices are provided with means for uncoupling the draft eye and others are provided with means for preventing the rattling of the parts. In our invention, however, as stated before, both of these objects are attained.

Referring now to Fig. 1, we have shown therein a thill coupling comprising a main frame portion A having the laterally projecting arms $a$, $b$ and $c$ and the integral axle clip $d$. The latter is bent around and has a threaded reduced portion to which is secured the clip plate $e$, as shown in the drawing by means of the nuts $f$. The clip plate $e$ has an upwardly turned end $g$. Secured to the under side of the arms $c$ and $b$ is a U-shaped supporting member $h$ upon which the spring S is pivotally secured. The upper end $s$ of the spring S is arranged to bear against the draft eye D. The opposite end of the spring, $s'$ is pivotally secured to a lever L, which is provided with a link P arranged to engage over the upturned end $g$ of the clip plate $e$, as shown in Fig. 2. The coupling pin C is arranged for sliding movement in openings in the arms $a$, $b$ and $c$. A spiral spring $k$ is arranged on the coupling pin between the arms $a$ and $b$. At one end of the spring is a head $m$ having a pin $o$ arranged to enter a slot in the arm $b$, to limit the movement of the coupling pin. The outer end of the coupling pin is curved in the form of a loop $r$ to provide a convenient handle.

From the foregoing explanation of the various parts the operation thereof will be readily understood. The axle clip is secured around the axle E by tightening up the nuts $f$. The lever L is thrown downwardly in the position indicated in dotted lines in Fig. 1. This permits the upper part $s$ of the spring S to swing back into the position shown in dotted lines. The handle $r$ is now pulled outwardly. The draft eye of the thill T is inserted between the arms $c$ and $b$ and the handle $r$ is released. The spring $k$ then brings the coupling pin into the proper position, the pin $o$ entering the slot to prevent the turning of the main coupling pin. The link P is now brought up over the upturned end $g$ and the lever L is forced upwardly into the position shown in full lines in Fig. 1. It will be noted that this lever L is operated upon a cam principle so that when it is in the position shown in Fig. 2, the spring S bears firmly on the draft eye D, thereby keeping the latter from rattling.

With the construction herein described it will not always be necessary to unlock the link $p$ from the upturned end $g$, the mere pulling of lever L downwardly being sufficient to relieve the pressure of the spring S upon the draft eye D.

We claim—

The combination with a draft eye, of a thill coupling comprising a frame provided with laterally extending arms having alined openings, an integral axle clip and a clip plate therefor, a coupling pin arranged to reciprocate in the openings in said arms, a spiral spring mounted on said coupling pin, one end of said spiral spring bearing upon one arm and the other end being provided with a head arranged to bear upon another arm, a pin carried by said head and adapted to enter a slot in the adjacent arm to prevent rotation of the coupling pin, a U- shaped suspending member secured to two of said arms, a friction spring pivotally mounted upon said U-shaped member, a lever pivotally connected with one end of said spring and having a link arranged to hook over the upturned end of said clip plate, whereby the outward movement of the lever will cause the upper end of said spring to rotate around its pivotal support and bear against said draft eye.

VERNE B. HENBY.
HENRY FINTEL, Jr.

Witnesses:
LEE HAYES,
JOHN JONES.